US011537944B2

(12) United States Patent
Nayak et al.

(10) Patent No.: US 11,537,944 B2
(45) Date of Patent: Dec. 27, 2022

(54) METHOD AND SYSTEM TO GENERATE MACHINE LEARNING MODEL FOR EVALUATING QUALITY OF DATA

(71) Applicant: HERE Global B.V., Eindhoven (NL)

(72) Inventors: Amarnath Nayak, Mumbai (IN); Leon Stenneth, Chicago, IL (US); Alex Averbuch, Buffalo Grove, IL (US)

(73) Assignee: HERE GLOBAL B.V., Eindhoven (NL)

( * ) Notice: Subject to any disclaimer, the term of this patent is extended or adjusted under 35 U.S.C. 154(b) by 512 days.

(21) Appl. No.: 16/738,652

(22) Filed: Jan. 9, 2020

(65) Prior Publication Data

US 2021/0216076 A1 Jul. 15, 2021

(51) Int. Cl.
*G06N 20/20* (2019.01)
*G06N 20/00* (2019.01)

(52) U.S. Cl.
CPC ............. *G06N 20/00* (2019.01); *G06N 20/20* (2019.01)

(58) Field of Classification Search
None
See application file for complete search history.

(56) References Cited

U.S. PATENT DOCUMENTS 9,285,230 B1 3/2016 Silver et al.
10,013,610 B2* 7/2018 Chen .................. G06T 7/248
11,188,575 B2* 11/2021 Giurgiu ................. H04L 67/12
2010/0179930 A1 7/2010 Teller et al.
2019/0147331 A1* 5/2019 Arditi .................... G06V 20/58
706/20

OTHER PUBLICATIONS

Gayatri et al., "Feature Selection Using Decision Tree Induction in Class Level Metrics Dataset for Software Defect Predictions", Proceedings of the World Congress on Engineering and Computer Science 2010 vol. I, WCECS 2010, Oct. 20-22, 2010, 6 pages.
Rosati et al., "Comparison of Different Sets of Features for Human Activity Recognition by Wearable Sensors", Article, Sensors (Basel). Published online Nov. 29, 2018, retrieved from https://www.ncbi.nlm.nih.gov/pmc/articles/PMC6308535/pdf/sensors-18-04189.pdf, 16 pages.

* cited by examiner

*Primary Examiner* — Abdhesh K Jha
(74) *Attorney, Agent, or Firm* — Jeffrey R. Moisan; Here Global B.V.

(57) ABSTRACT

A system, a method and a computer program product are provided for evaluating quality of data, such as sensor data and map data, using a machine learning model. The system may include at least one memory configured to store computer executable instructions and at least one processor configured to execute the computer executable instructions to obtain first sensor features of the first sensor data associated with a road object in a first geographic region, first map features of the first map data associated with the road object and ground truth data associated with the road object. The processor may be configured to generate the machine learning model by configuring the ground truth data and calculating first information scores for each of the first sensor features and the first map features by recursively splitting each of the first sensor features and the first map features.

18 Claims, 13 Drawing Sheets

400A

| positionEstimate { | recognitionState_ =1,laneBoundary_ =<null>,radarData_ =<null>,heightIn |
| --- | --- |
| | Centimeters_ =<null>,memoizedIsInitialized=1,unknownFields=,memoizedSize=-1 |
| | ,memoizedHashCode=-1734259931]PDAdditionalDataEndPDAdditionalDataStart |
| timeStampUTC_ms: 1546533 | 1546621249517com.here.cvs.bsc.pd.PDAdditionalProtos$PhysicalDividerAdditional |
| 774682 | Data@20ce78ec[bitField0_ =7,pdModelConsistency_ =0.56,distanceInMeters_ = |
| positionType: RAW_GPS | average: 3.4 |
| longitude_deg: 11.731022 | median: 3.4 |

FIG. 4A

| Features | Feature Description |
|---|---|
| Distance in meters (DIM) | The average of all PD distances in metres. It is rounded to 2 decimal places. |
| Median | The median of all PD distances in metres. |
| Maximum | The largest PD distance in metres. |
| Minimum | The lowest PD distance in metres. |
| Standard deviation (SD) | The standard deviation of all PD distances in metres. It is rounded to 2 decimal places. |
| Event type | The event type of the probe, the function script only sends probes "INITIAL (1)", "UPDATE (2)" and "CANCELLATION (3)". |
| Consistency | Measure of consistency between PD and radar points distance measurements of all packages in the current window. The consistency is given as a value between 0 and 1. The value tends to 1 if the difference between the distance and each quantile (25, 50, 75) is very small. Otherwise it tends more to 0. |
| PD flag | Whether the sensor has detected PD or not. The output is a Boolean value (true or false) |

| Map Features |
|---|
| • Display bits |
| • Functional class |
| • Speed category |
| • From reference Number lane |
| • To reference speed limit |
| • From reference speed limit |
| • To reference number lane |
| • Access bits |
| • Long haul |
| • Divider |
| • Lane category |
| • Intersection category |
| • From reference physical num lane |
| • To reference physical num lane |
| • Stub link |
| • Special attributes |

| Feature No. | Feature name | Feature type | Feature Importance score (based on information gain) |
|---|---|---|---|
| 2 | Display bits | Map feature | 0.15 |
| 17 | Functional class | Map feature | 0.14 |
| 12 | Speed category | Map feature | 0.13 |
| 2 | From reference number lane | Map feature | 0.09 |
| 3 | To reference speed limit | Map feature | 0.07 |
| 4 | From reference speed limit | Map feature | 0.04 |
| 5 | To reference number lane | Map feature | 0.04 |
| 1 | Access bits | Map feature | 0.04 |
| 8 | Long haul | Map feature | 0.04 |
| 13 | Divider | Map feature | 0.03 |
| 11 | Lane category | Map feature | 0.03 |
| 10 | Intersection category | Map feature | 0.02 |
| 15 | From reference physical num lane | Map feature | 0.01 |
| 14 | To reference physical num lane | Map feature | 0.01 |
| 9 | Stub link | Map feature | 0.01 |
| 0 | Special attributes | Map feature | 0.01 |
| 19 | Median | Sensor feature | 0.01 |
| 16 | Distance in meters | Sensor feature | 0.0 |
| 17 | Consistency | Sensor feature | 0.0 |
| 21 | Standard deviation | Sensor feature | 0.0 |
| 18 | Flag | Sensor feature | 0.0 |
| 20 | Event type | Sensor feature | 0.0 |

METHOD AND SYSTEM TO GENERATE MACHINE LEARNING MODEL FOR EVALUATING QUALITY OF DATA

TECHNOLOGICAL FIELD

An example embodiment of the present invention generally relates to evaluating quality of data for mapping and navigation applications, and more particularly relates to a system, a method, and a computer programmable product for generating a machine learning model for evaluating the quality of data (such as, sensor data and map data).

BACKGROUND

Various consumer vehicles are configured with sensors. Such consumer vehicles may provide a large amount of sensor data for surrounding environment which can be used in autonomous driving. In certain scenarios, the sensor data may be used to detect road objects (such as, a road sign, a physical divider on a road, or detect a hazardous situation on a road) for navigation applications, especially in autonomous driving. The autonomous driving may aim to navigate without driver intervention. For such applications, quality of sensor data collected from the consumer vehicles may be imprecise and inaccurate. When the imprecise and inaccurate sensor data may be further used to develop algorithms and products for the navigation and mapping applications, such data may lead to generation of ineffective models. In certain scenarios, the imprecise and inaccurate sensor data may lead to erroneous observation on a road that may be utilized locally by a vehicle for performing navigation functions. Consequently, the vehicle may incorrectly comprehend the observation which can lead to undesired situations, such as, accidents. Furthermore, this can cause an autonomous vehicle to make an illegal driving maneuver.

BRIEF SUMMARY

Accordingly, there is a need for evaluating quality of data (such as, sensor data and map data) such that accurate and high quality data may be used to develop algorithms and products for providing high quality navigation assistance.

The present disclosure provides a system, a method and a computer program product to access and measure the quality of data (such as, but not limited to, sensor data and map data) using machine learning model, in accordance with various embodiments.

Embodiments of the disclosure provide a system of generating a machine learning model based on first sensor data and first map data, the system comprising at least one memory configured to store computer executable instructions and at least one processor configured to execute the computer executable instructions to obtain first sensor features of the first sensor data associated with a road object in a first geographic region, first map features of the first map data associated with the road object and ground truth data associated with the road object. The processor may be configured to generate the machine learning model by configuring the ground truth data and calculating first information scores for each of the first sensor features and the first map features by recursively splitting each of the first sensor features and the first map features, The first information scores may correspond to quality of the first sensor data and the first map data.

In accordance with an embodiment, the first information scores may correspond to a rank of each of the first sensor features and the first map features. An order of the rank may start with a top ranked feature that corresponds to a most informative feature. The most informative feature is the feature that contributes the most towards the targeted prediction label.

In accordance with an embodiment, the at least one processor may be further configured to determine reliability first data from the first sensor data and first map data, based on the first information scores being greater than a pre-defined threshold value.

In accordance with an embodiment, the at least one processor may be further configured to receive an input specifying the first geographic region and generate a notification message indicating a degree of reliability of the first sensor data and the first map data at a first instance of time.

In accordance with an embodiment, to recursively split each of the sensor features and the map features, the at least one processor may be further configured to calculate entropy of each of the first sensor features and the first map features.

In accordance with an embodiment, the entropy may be calculated as $$\text{Entropy}(S) = p_+(-\log_2 p_+) + p_-(-\log_2 p_-)$$

wherein S is a sample of training examples associated with the sensor features and the map features,
wherein p+ is proportion of positive class in S,
wherein p− is proportion of negative class in S, and
wherein Entropy (S) is average optimal number of bits to encode information about certainty or uncertainty in S.

In accordance with an embodiment, the at least one processor may be further configured to calculate an information gain associated with each of the first sensor features and the first map features at each level of a decision tree, based on a difference in the calculated entropy at two consecutive levels of the decision tree. The information gain at each level of the decision tree may be inversely proportional to the calculated entropy at each level. The split with lowest calculated entropy may correspond to a maximum information gain.

In accordance with an embodiment, the at least one processor may be further configured to calculate a first feature importance score for each of the first sensor features and the first map features, based on the information gain associated with each of the first sensor features and the first map features of one or more decision trees.

In accordance with an embodiment, the at least one processor may be further configured to access the machine learning model which is trained on the first sensor features of the first sensor data, the first map features of first map data, and the ground truth data associated with the road object. The at least one processor may be further configured to obtain second sensor features of second sensor data in a second geographic region for another road object and second map features of second map data in the second geographic region. The at least one processor may be further configured to calculate second information scores, using the machine learning model, for each of the obtained second sensor features and the second map features by recursively splitting each of the second sensor features and the second map features.

In accordance with an embodiment, the at least one processor may be further configured to determine reliability second data from the second sensor data and the second map data, based on the second information scores being greater than the pre-defined threshold value.

In accordance with an embodiment, the at least one processor may be further configured to compare the second reliability data with the first reliability data, based on the second information scores and the first information scores.

In accordance with an embodiment, the at least may be one processor is further configured to receive an input specifying the second geographic region at the second instance of time and generate a notification message indicating a degree of reliability of data from the first reliability data or the second reliability data at the second instance of time, based on the comparison.

In accordance with an embodiment, the at least one processor may be further configured to transmit the quality of the first sensor data and the first map data to at least one subject. The subject may comprise at least one of a vehicle or user equipment.

In accordance with an embodiment, the first map features may be obtained from map data of a map database for a predefined date. The map features may correspond to one or more attributes of the road object. The one or more attributes may comprise one or more of display bits, functional class, speed category, number of lanes, speed limit, access bits, long haul, lane category, physical divider, intersection category, lane category, stub link, or special attributes.

In accordance with an embodiment, the ground truth data may be obtained from a plurality of sensors of one or more dedicated vehicles in the geographic region for a predefined date. The ground truth data may correspond to the actual detection of presence or absence of the road object in the first geographic region. The machine learning model may correspond to, any suitable machine learning model such as, but not limited to, a tree based machine learning model (such as, Decision Trees and Random Forest) and meta-level machine learning model (such as, Voting and Stacking).

Embodiments of the disclosure provide a method for evaluating quality of sensor data. The method may comprise obtaining a machine learning model. The machine learning model may be trained on first sensor features of first sensor data associated with a road object in a geographic region, and ground truth data associated with the road object. The method may further comprise obtaining second sensor features of second sensor data associated with the road object, using the machine learning model by calculating information scores for each of the second sensor features by recursively splitting each of the second sensor features, and evaluating quality of the second sensor data based on the information scores. The machine learning model may correspond to a tree-based machine learning model.

In accordance with an embodiment, the information scores may correspond to a rank of each of the second sensor features. An order of the rank starts with a top ranked feature that corresponds to a most informative feature.

Embodiments of the disclosure provide a computer program product comprising at least one non-transitory computer-readable storage medium having stored thereon computer-executable instructions which when executed by a computer, cause the computer to carry out operations for selecting vehicle functionality. The operations may comprise accessing a machine learning model which may be trained on first sensor features of first sensor data, first map features of first map data, and ground truth data associated with a road object, obtaining, at near real time, second sensor features of second sensor data and second map features of second map data associated with another road object. The machine learning model may calculate information scores for each of the obtained second sensor features and the second map features by recursively splitting each of the second sensor features and the second map features. The operations may further comprise instructing the vehicle functionality as a function of the information scores.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
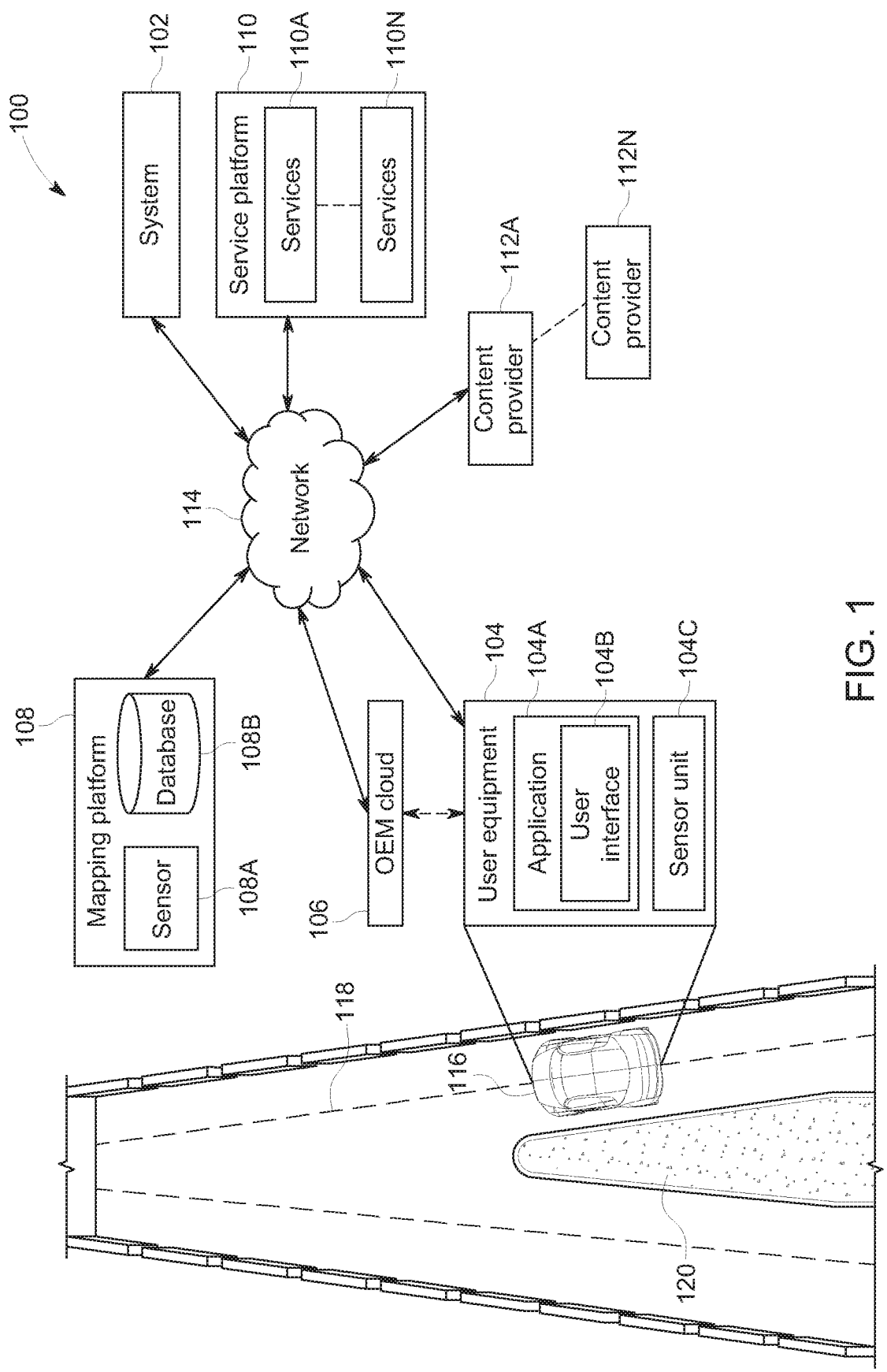
Figure 2:
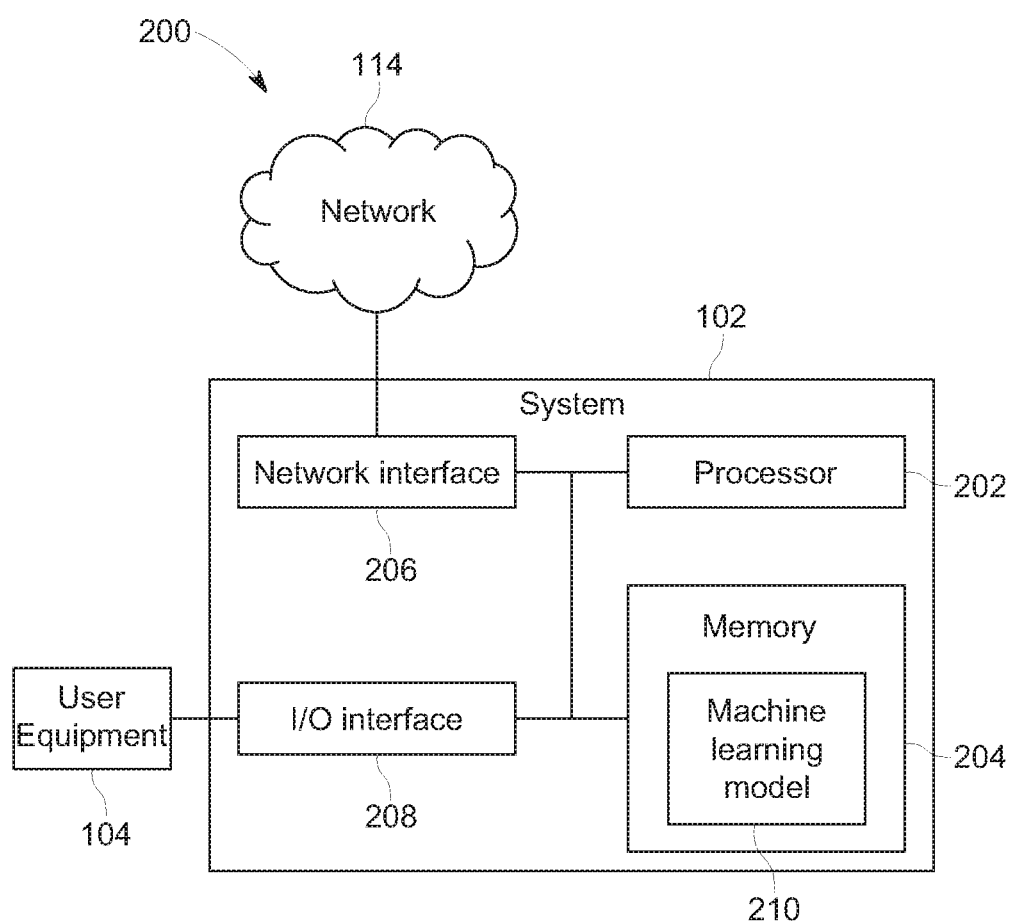
Figure 3:
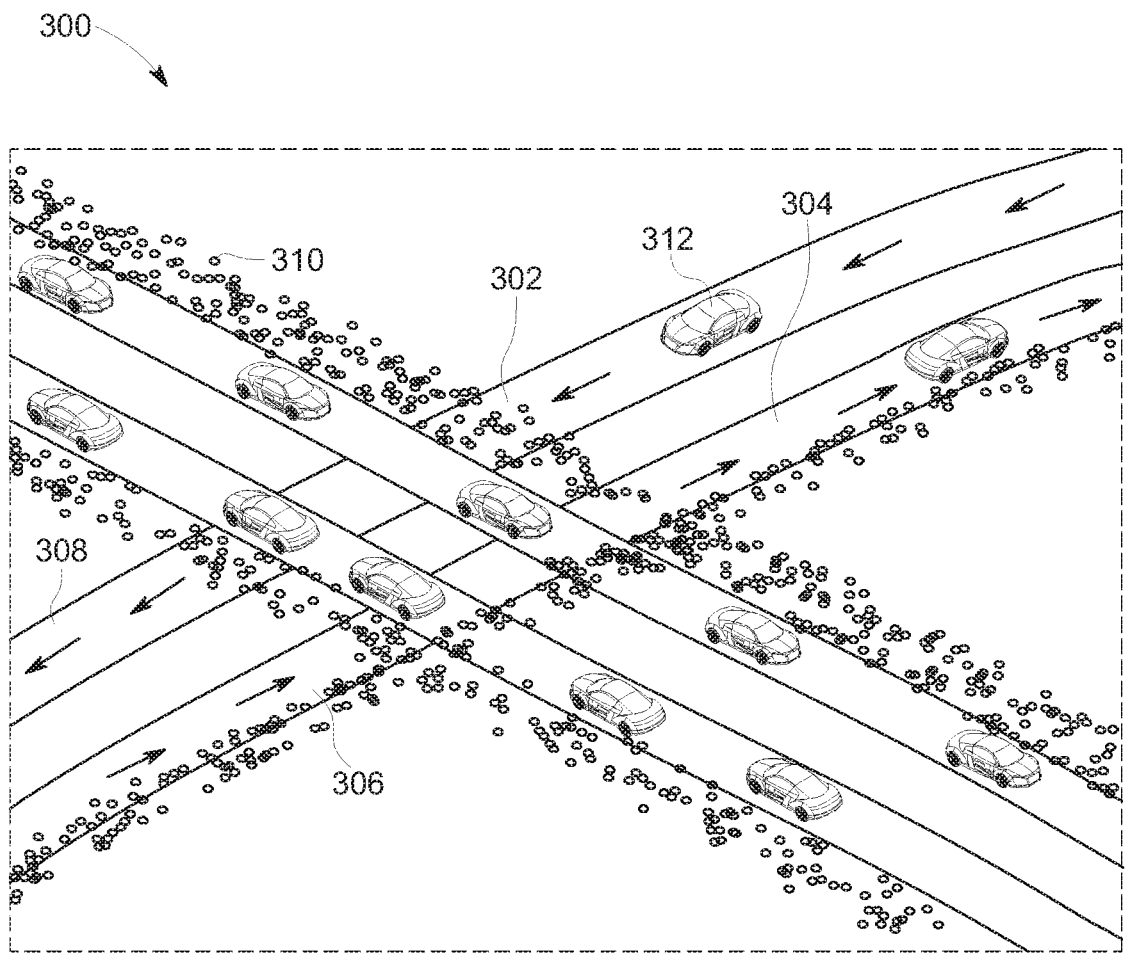
Figure 4D:
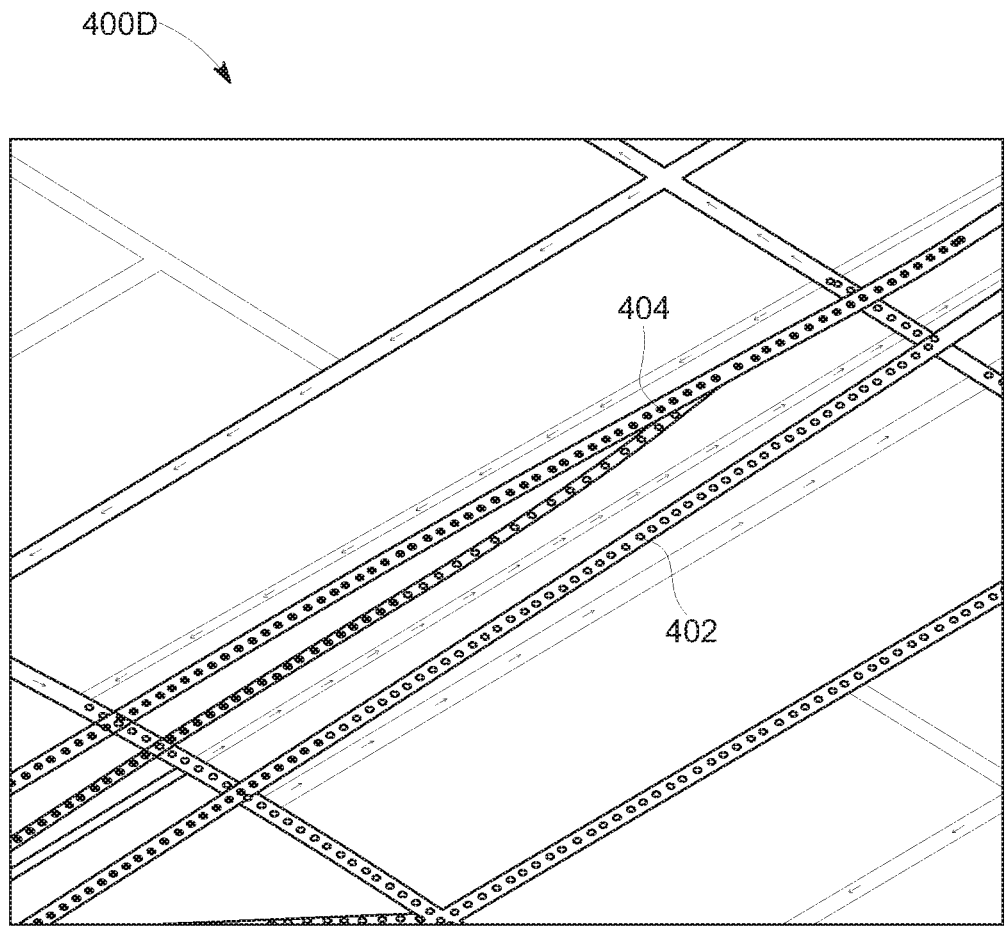
Figure 5:
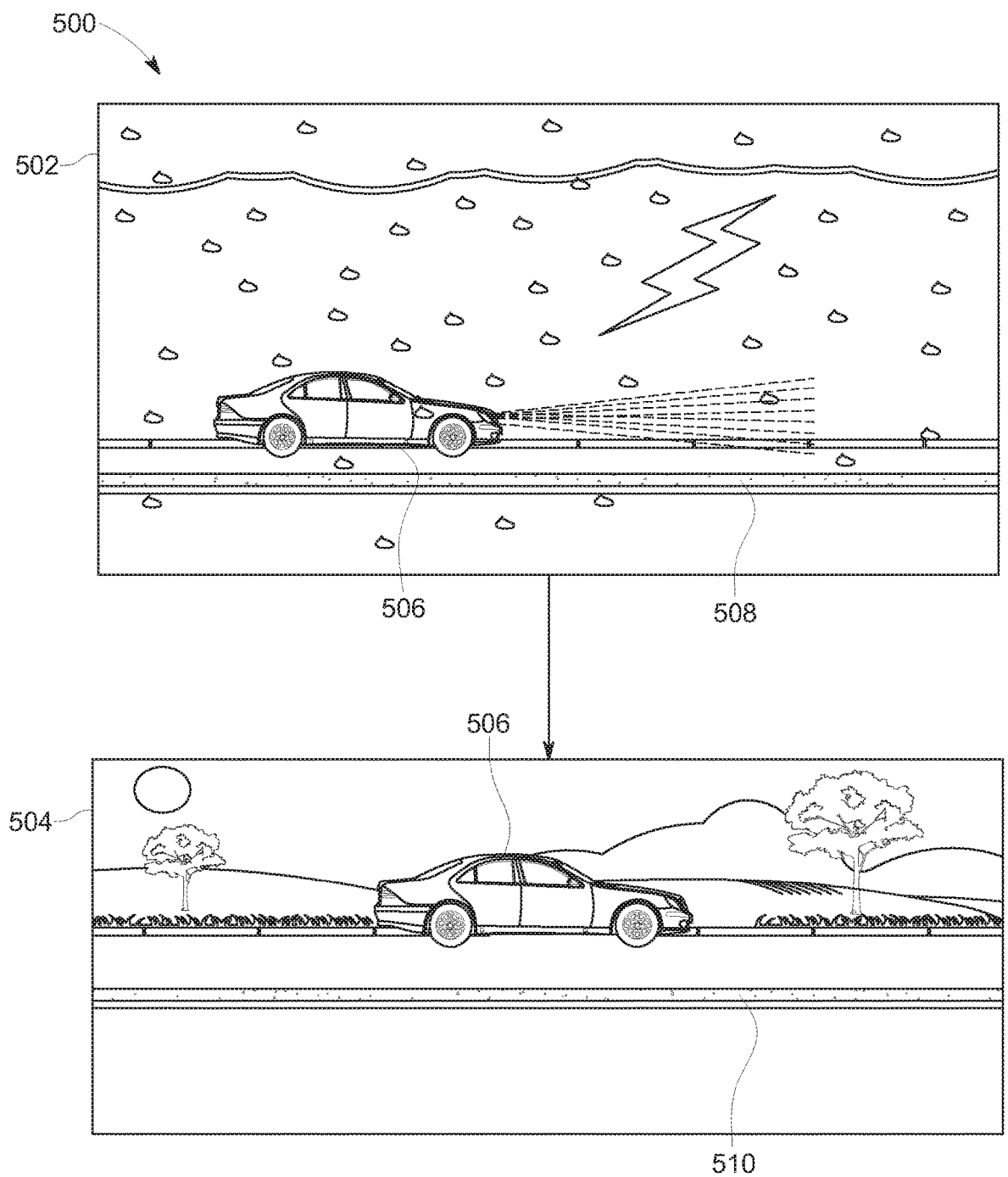
Figure 6A:
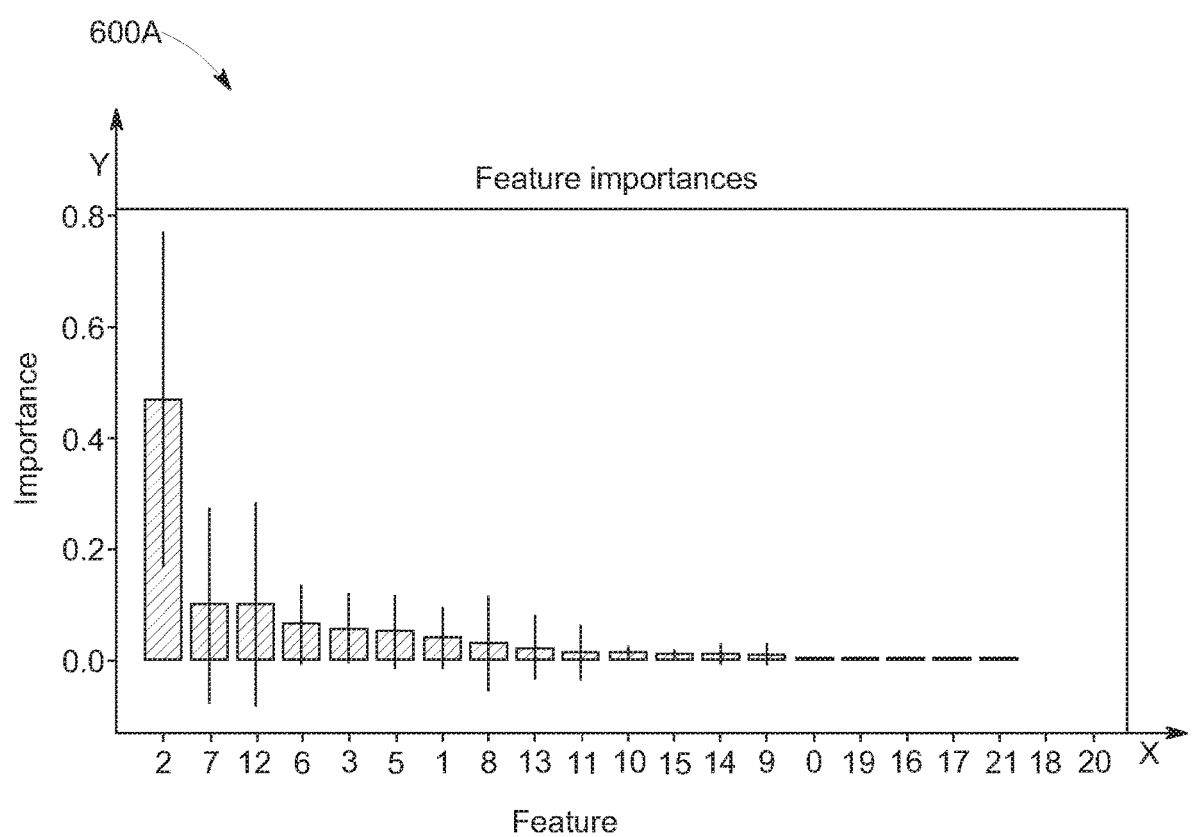
Figure 7:
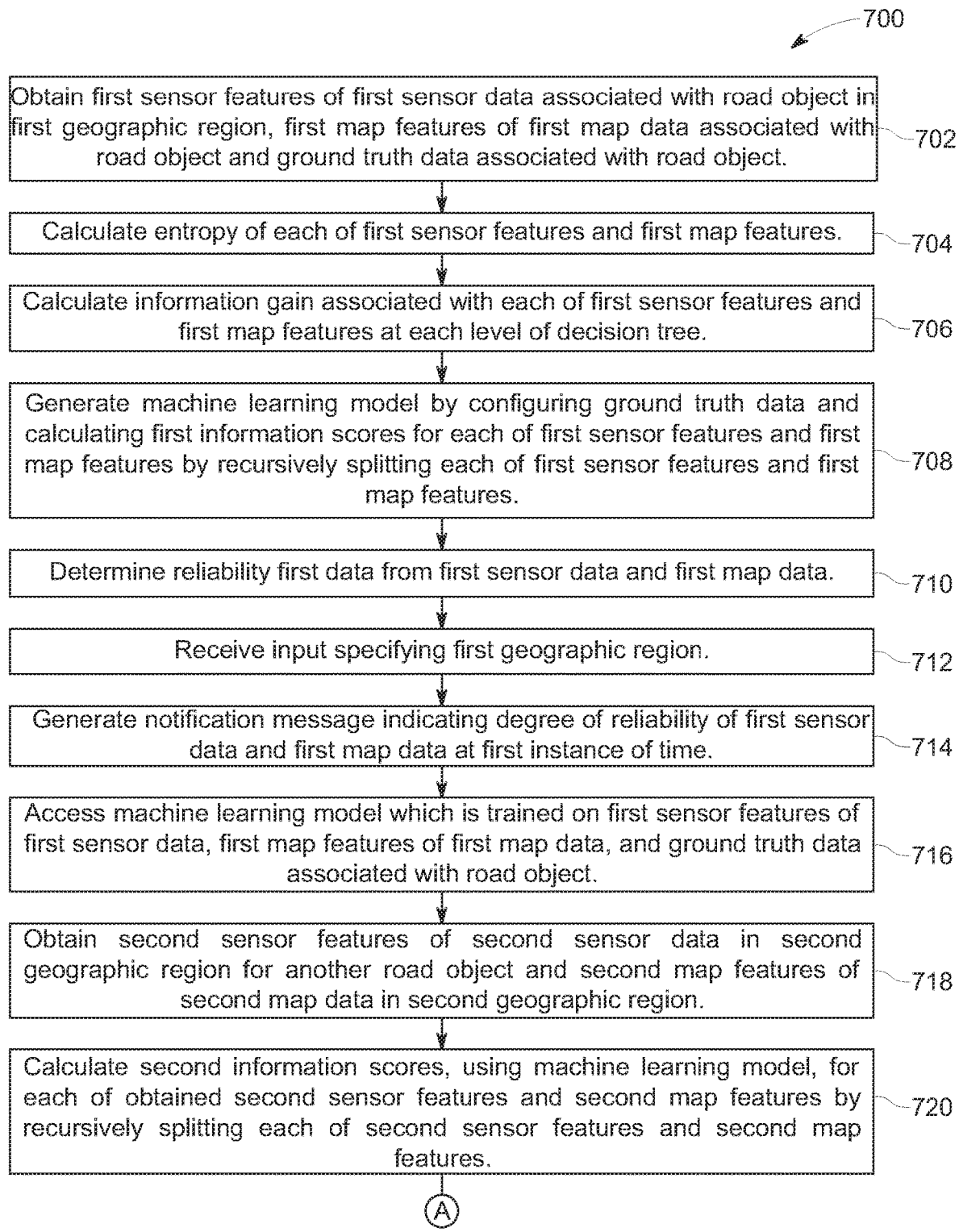
Figure 7:
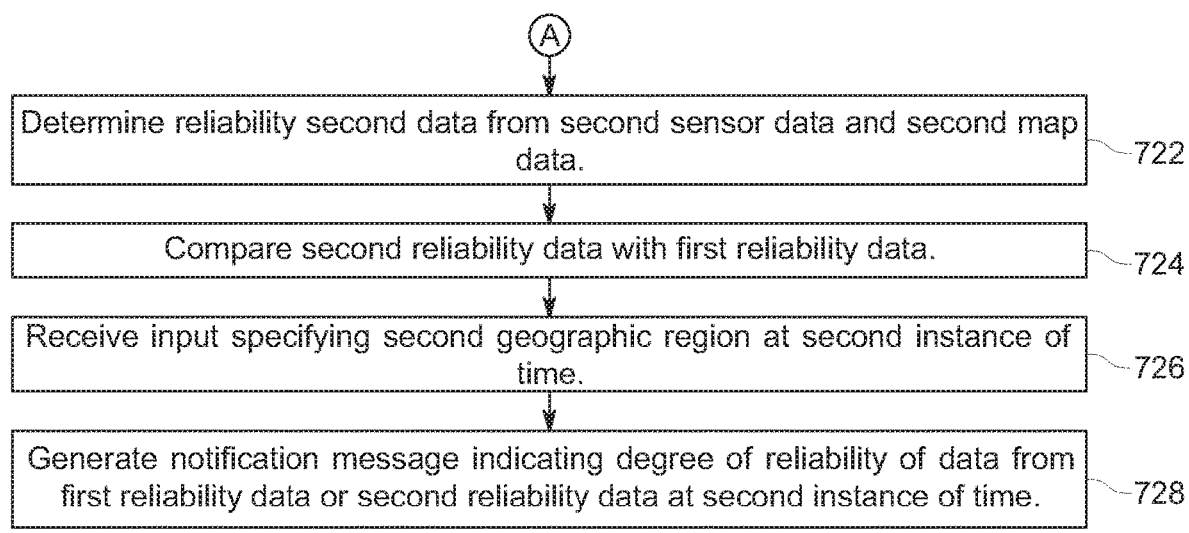
Figure 8:
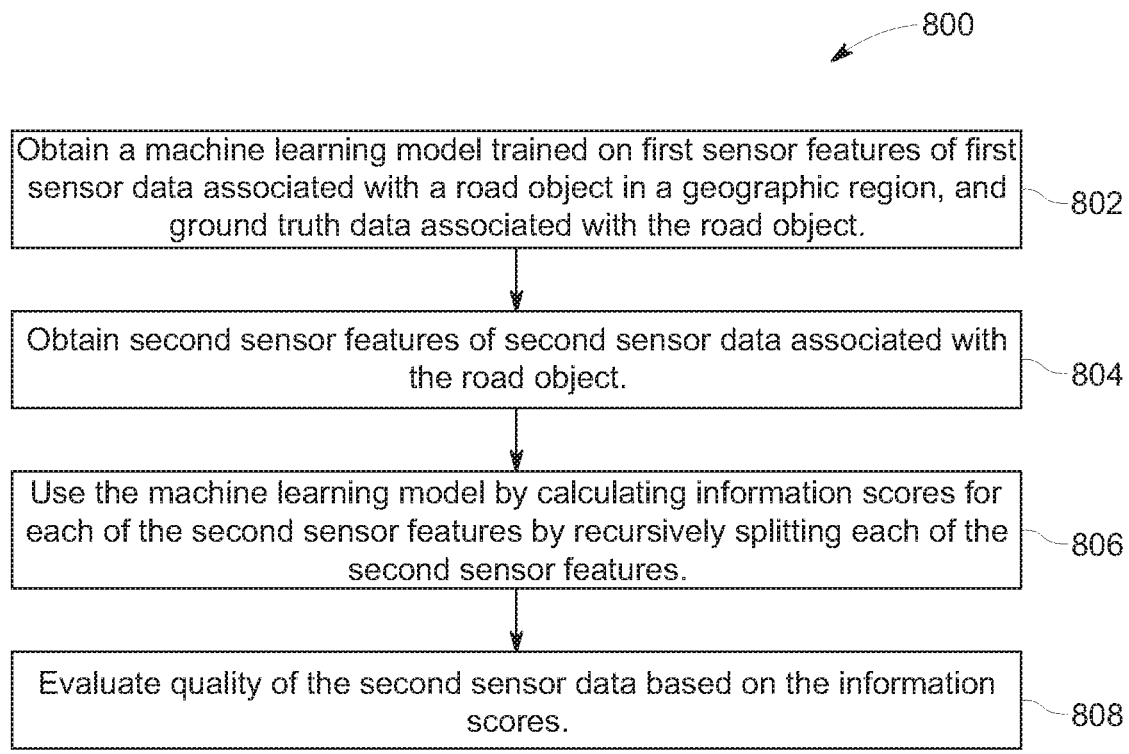
Figure 9:
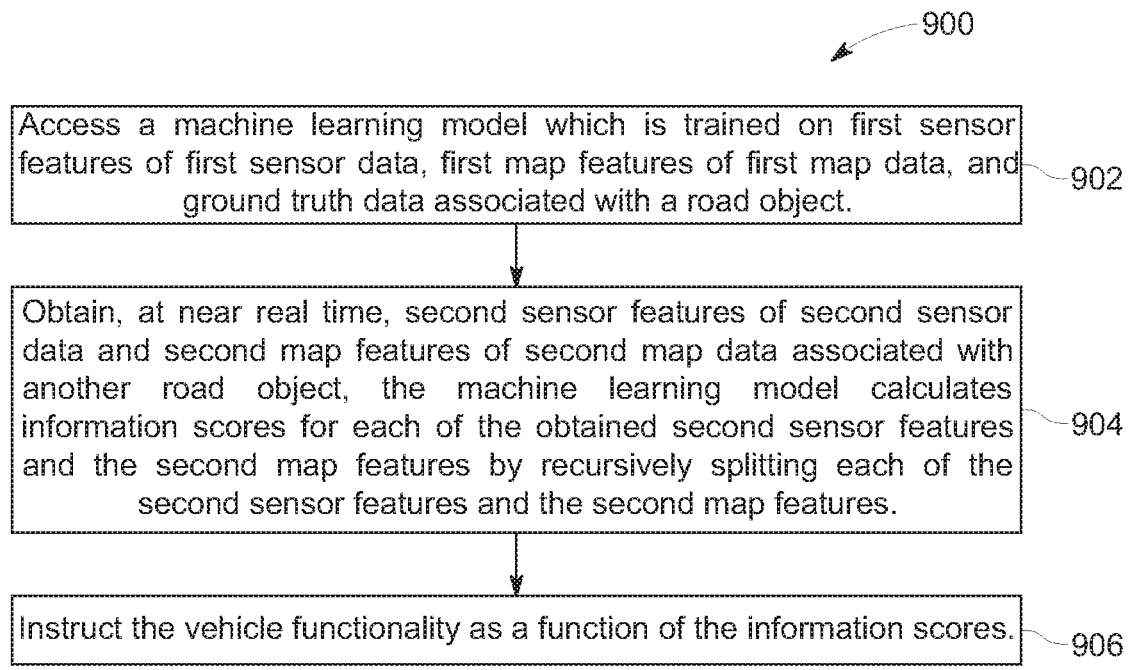

Having thus described example embodiments of the invention in general terms, reference will now be made to the accompanying drawings, which are not necessarily drawn to scale, and wherein:

FIG. 1 illustrates a schematic diagram of a network environment 100 of a system for generating a machine learning model based on first sensor data and first map data, in accordance with an example embodiment;

FIG. 2 illustrates a block diagram 200 of the system, as illustrated in FIG. 1, for generating a machine learning model based on first sensor data and first map data, in accordance with an example embodiment;

FIG. 3 illustrates an exemplary scenario 300 depicting a problem of mismatch while superimposition of the sensor data on a map obtained from a database in a geographic location, in accordance with an embodiment;

FIG. 4A illustrates a tabular representation 400A of the first sensor data obtained by the system exemplarily illustrated in FIG. 1, in accordance with an embodiment;

FIG. 4B illustrates a tabular representation 400B of the first sensor features obtained from the first sensor data exemplarily illustrated in FIG. 4A, in accordance with an embodiment;

FIG. 4C illustrates a tabular representation 400C of the first map features obtained from the first map data by the system exemplarily illustrated in FIG. 1, in accordance with an embodiment;

FIG. 4D illustrates a representation 400D of ground truth (GT) data for a road object in a geographic region, obtained from dedicated vehicles, in accordance with an embodiment;

FIG. 5 is a schematic diagram 500 that illustrates an exemplary scenario for evaluating quality of data using the system, in accordance with an embodiment;

FIGS. 6A and 6B illustrate a graphical representation 600A and a tabular representation 600B, respectively, to show feature importance associated with the first sensor features and the first map features, in accordance with an embodiment;

FIG. 7 illustrates a flowchart 700 for implementation of an exemplary method for generating a machine learning model based on first sensor data and first map data, in accordance with an example embodiment;

FIG. 8 illustrates a flowchart 800 for implementation of an exemplary method to evaluating quality of sensor data, in accordance with an embodiment; and FIG. 9 illustrates a flowchart 900 for implementation of an exemplary method instructing the vehicle functionality as a function of the information scores, in accordance with an embodiment.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definition

The term "autonomous vehicle" may refer to any vehicle having autonomous driving capabilities at least in some conditions. An autonomous vehicle, as used throughout this disclosure, may refer to a vehicle having autonomous driving capabilities at least in some conditions. The autonomous vehicle may also be known as a driverless car, robot car, self-driving car or autonomous car. For example, the vehicle may have zero passengers or passengers that do not manually drive the vehicle, but the vehicle drives and maneuvers automatically. There can also be semi-autonomous vehicles.

End of Definition

A system, a method, and a computer program product are provided herein in accordance with an example embodiment for evaluating quality of data, such as, but not limited to, first sensor data and first map data. In some example embodiments, the method, the system, and the computer program product provided herein may also be used for selecting vehicle functionality. The system, the method, and the computer program product disclosed herein provide measures to check quality of data (such as, the first sensor data and the first map data) for ensuring accurate and precise data to develop algorithms and products for providing high quality navigation assistance, especially in autonomous driving in near real time. Therefore, embodiments of the present disclosure provide reliability data from the sensor data (such as the first sensor data and second sensor data) and the map data (such as, the first map data and the second map data) that may be used for high-end applications, such as, but not limited to, autonomous or self-driving vehicles.

The system, the method, and the computer program product disclosed herein may further provide a notification message indicating a degree of reliability of the sensor data and the map data at a certain instance of time. For example, the notification message may inform a vehicle or user equipment about availability of accurate and up-to-date data for a certain geographic region. Alternatively, the available up-to-date data may be pushed as an update to the vehicle or user equipment. In this way, a beneficiary of the data (such as, the vehicle) may be provided with highly accurate navigation assistance based on the up-to-date data. These and other technical improvements of the present disclosure will become evident from the description provided herein.

FIG. 1 illustrates a schematic diagram of a network environment 100 of a system 102 for generating a machine learning model based on first sensor data and first map data, in accordance with an example embodiment. There is shown is shown the network environment 100 that may include the system 102, a user equipment (UE) 104, an application 104A, a user interface 104B, a sensor unit 104C, an OEM cloud 106, a mapping platform 108, a services platform 110 with a plurality of services 110A . . . 110N, a plurality of content providers 112A . . . 112N and a network 114. There is further shown one or more vehicles, such as a vehicle 116 on a roadway 118 in a first geographic region. The roadway may include a road object, such as a physical divider 120. The mapping platform 108 may further include a server 108A and a database 108B. Further, the server 108A and the database 108B may be communicatively coupled to each other.

The system 102 may comprise suitable logic, circuitry, interfaces and code that may be configured to obtain first sensor features of the first sensor data associated with a road object (such as, the physical divider 120) in the first geographic region, first map features of the first map data associated with the road object and ground truth data associated with the road object. The system 102 may be configured to generate a machine learning model by configuring the ground truth data and calculating first information scores for each of the first sensor features and the first map features by recursively splitting each of the first sensor features and the first map features. The system 102 may be communicatively coupled to the UE 104, the OEM cloud 106, the mapping platform 108, the services platform 110, the plurality of content providers 112A . . . 112N, via the network 114. In some example embodiments, the system 102 may be communicatively coupled to the UE 104, via the network 114. Additionally or alternately, in some example embodiments, the system 102 may be communicatively coupled to the UE 104 via the OEM cloud 106 which in turn may be accessible to the system 102 via the network 114.

All the components in the network environment 100 may be coupled directly or indirectly to the network 114. The components described in the network environment 100 may be further broken down into more than one component and/or combined together in any suitable arrangement. Further, one or more components may be rearranged, changed, added, and/or removed. Furthermore, fewer or additional components may be in communication with the system 102, within the scope of this disclosure.

The system 102 may be embodied in one or more of several ways as per the required implementation. For example, the system 102 may be embodied as a cloud based service or a cloud based platform. As such, the system 102 may be configured to operate outside the UE 104. However, in some example embodiments, the system 102 may be embodied within the UE 104, for example as part of an in-vehicle navigation system. In each of such embodiments, the system 102 may be communicatively coupled to the components shown in FIG. 1 to carry out the desired operations and wherever required modifications may be possible within the scope of the present disclosure.

The UE 104 may be any user accessible device, such as, a mobile phone, a smartphone, a portable computer, and the like that is portable in itself or as a part of another portable/mobile object, such as, the vehicle 116. In some example embodiments, the UE 104 may be vehicles. The UE 104 may comprise a processor, a memory and a communication interface. The processor, the memory and the communication interface may be communicatively coupled to each other. In some example embodiments, the UE 104 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. As such, the UE 104 may be an autonomous vehicle, semi-autonomous vehicle or a manually driven vehicle. In such example embodiments, the UE 104 may comprise processing means such as a central processing unit (CPU), storage means such as onboard read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the UE 104. Additional, different, or fewer components may be provided. For example, the UE 104 may be configured to execute and run mobile applications such as a messaging application, a browser application, a navigation application, and the like. In accordance with an embodiment, the UE 104 may be directly coupled to the system 102 via the network 114. For example, the UE 104 may be a dedicated vehicle (or a part thereof) for gathering data for development of the map data in the database 108B. In some example embodiments, the UE 104 may be coupled to the system 102 via the OEM cloud 106 and the network 114. For example, the UE 104 may be a consumer vehicle (or a part thereof) and may be a beneficiary of the services provided by the system 102. In some example embodiments, the UE 104 may serve the dual purpose of a data gatherer and a beneficiary device. The UE 104 may be configured to capture sensor data (such as, the first sensor data) associated with the roadway 118 which the UE 104 may be traversing. The sensor data may correspond to, but not limited to, image data of road objects, road signs, or the surroundings (for example buildings, road objects, and the like).

The UE 104 may include the application 104A with the user interface 104B to access one or more map and navigation related functions. In other words, the UE 104 may include the application 104A (such as, a mapping application) with the user interface 104B.

The sensor unit 104C may be configured within the UE 104. The sensor unit 104C comprising multiple sensors may capture sensor data, such as road objects along routes in a certain geographic location. In accordance with an embodiment, the sensor unit 104C may be built-in, or embedded into, or within interior of the UE 104. In some embodiments, the vehicle 116 may have sensors positioned on or within the vehicle 116. The sensors of the sensor unit 104C may be configured to provide the sensor data comprising location data associated with a location of the vehicle 116, heading data associated with the road signs, (such as, speed limit signs 114), sign types of the road signs, sign values of the road signs along the roadway. In accordance with an embodiment, the sensor unit 104C may be configured to transmit the sensor data to an Original Equipment Manufacturer (OEM) cloud. Examples of the sensors in the sensor unit 104C may include, but not limited to, a camera, an acceleration sensor, a gyroscopic sensor, a LIDAR sensor, a proximity sensor, and a motion sensor.

The sensor data may refer to sensor data collected from a sensor unit 104C in the UE 104. The sensor data may be collected from a large number of consumer vehicles traversing on a road link. In accordance with an embodiment, the sensor data may refer to the point cloud data. The point cloud data may be a collection of data points defined by a given coordinates system. In a 3D coordinates system, for instance, the point cloud data may define the shape of some real or created physical objects. The point cloud data may be used to create 3D meshes and other models used in 3D modelling for various fields. In a 3D Cartesian coordinates system, a point is identified by three coordinates that, taken together, correlate to a precise point in space relative to a point of origin. The LIDAR point cloud data may include point measurements from real-world objects or photos for a point cloud data that may then be translated to a 3D mesh or NURBS or CAD model. In accordance with an embodiment, the sensor data may be converted to units and ranges compatible with the mapping platform 108, to accurately receive the sensor data.

The mapping platform 108 may comprise suitable logic, circuitry, interfaces and code that may be configured to store map data associated with the one or more road objects and map features. The server 108A of the mapping platform 108 may comprise processing means and communication means. For example, the processing means may comprise one or more processors configured to process requests received from the system 102 and/or the UE 104. The processing means may fetch map data from the database 108B and transmit the same to the system 102 and/or the UE 104 in a suitable format. In one or more example embodiments, the mapping platform 108 may periodically communicate with the UE 104 via the processing means to update a local cache of the map data stored on the UE 104. Accordingly, in some example embodiments, map data may also be stored on the UE 104 and may be updated based on periodic communication with the mapping platform 108.

The database 108B of the mapping platform 108 may store map data (such as, the first map data and the second map data) of one or more geographic regions (such as, the first geographic region and the second geographic region) that may correspond to a city, a province, a country or of the entire world. The database 108B may store point cloud data collected from the UE 104. The database 108B may store data such as, but not limited to, node data, road segment data, link data, point of interest (POI) data, link identification information, and heading value records. The database 108B may also store cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the database 108B may contain path segment and node data records, such as shape points or other data that may represent pedestrian paths, links or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The database 108B may also store data about the POIs and their respective locations in the POI records. The database 108B may additionally store data about places, such as cities, towns, or other communities, and other geographic features such as bodies of water, and mountain ranges. Such place or feature data can be part of the POI data or can be associated with POIs or POI data records (such as a data point used for displaying or representing a position of a city). In addition, the database 108B may include event data (e.g., traffic incidents, construction activities, scheduled events, unscheduled events, accidents, diversions etc.) associated with the POI data records or other records of the database 108B. Optionally or additionally, the database 108B may store 3D building maps data (3D map model of objects) of structures surrounding roads and streets.

The database 108B may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the UE 104. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

As mentioned above, the database 108B may be a master geographic database, but in alternate embodiments, the database 108B may be embodied as a client-side map database and may represent a compiled navigation database that may be used in or with end user devices (such as the UE 104) to provide navigation and/or map-related functions. In such a case, the database 108B may be downloaded or stored on the end user devices (such as the UE 104).

The services platform 110 may provide navigation related functions and the plurality of services 110A . . . 110N to the UE 104. The plurality of services 110A . . . 110N may include navigation functions, speed adjustment functions, traffic related updates, weather related updates, warnings and alerts, parking related services and indoor mapping services. In accordance with an embodiment, the plurality of services 110A . . . 110N may be provided by the plurality of content providers 112A . . . 112N. In some examples, the plurality of content providers 112A . . . 112N may access various Software Development Kits (SDKs) from the services platform 110 for implementation of the plurality of services 110A . . . 110N. In accordance with an embodiment, the services platform 110 and the mapping platform 108 may be integrated into a single platform to provide a suite of mapping and navigation related applications for OEM devices, such as the 110A . . . 110N. The UE 104 may be configured to interface with the services platform 110, the plurality of content provider 112A . . . 112N, and the mapping platform 108 over the network 114. Thus, the mapping platform 108 and the services platform 110 may enable provision of cloud-based services for the UE 104, such as, storing the sensor data in the OEM cloud 106 in batches or in real-time and retrieving the stored sensor data for determining boundary data of the top surface of each of one or more objects or evaluating the quality of sensor data.

The plurality of content providers 112A . . . 112N may be configured to maintain data stored in the database 108B. The plurality of content provider 112A . . . 112N, such as, a map developer may maintain the mapping platform 108. By way of example, the map developer may collect geographic data to generate and enhance the mapping platform 108. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Crowdsourcing of geographic map data may also be employed to generate, substantiate, or update map data. Crowdsourcing may be based on gathering data using customer vehicles. For example, sensor data from a plurality of data probes, which may be, for example, vehicles traveling along a road network or within a venue, may be gathered and fused to infer an accurate map of an environment in which the data probes are moving. Such sensor data may be updated in real time or near real time, such as, on an hourly basis, to provide accurate and up-to-date map data. The sensor data may be from any sensor that may inform the database 108B of features within an environment that are appropriate for mapping. For example, motion sensors, inertia sensors, image capture sensors, proximity sensors, LIDAR (light detection and ranging) sensors, ultrasonic sensors etc. The gathering of large quantities of crowd-sourced data may facilitate the accurate modeling and mapping of an environment, whether it is a road segment, a road object or the interior of a multi-level parking structure. Also, remote sensing, such as aerial or satellite photography, may be used to generate map geometries directly or through machine learning as described herein.

The network 114 may comprise suitable logic, circuitry, and interfaces that may be configured to provide a plurality of network ports and a plurality of communication channels for transmission and reception of data, such as the sensor data, map data from the database 108B, etc. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 114 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 114 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) networks (for e.g. LTE-Advanced Pro), 5G New Radio networks, ITU-IMT 2020 networks, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

FIG. 2 illustrates a block diagram of the system 102, exemplarily illustrated in FIG. 1, for generating a machine learning model based on data (such as, the first sensor data and the first map data), in accordance with an example embodiment. FIG. 2 is described in conjunction with elements from FIG. 1. The system 102 may comprise a processing means such as processor 202, storage means such as memory 204, a communication means such as network interface 206, an input/output (I/O) interface 208, and a machine learning model 210. The processor 202 may retrieve computer executable instructions that may be stored in the memory 204 for execution of the computer executable instructions. The system 102 may connect to the UE 104 via the I/O interface 208. The processor 202 may be communicatively coupled to the memory 204, the network interface 206, the I/O interface 208, and the machine learning model 210.

The processor 202 may comprise suitable logic, circuitry, and interfaces that may be configured to execute instructions stored in the memory 204. The processor 202 may obtain sensor features of the first sensor data associated with a road object (such as, the physical divider 120) in a first geographic region, first map features of the first map data associated with the road object (such as, the physical divider 120) and ground truth data associated with the road object (such as, the physical divider 120). The first sensor data may be captured by a plurality of consumer vehicles and the first map data may be accessed from the database 108B. The processor 202 may be configured to generate the machine learning model 210 by configuring the ground truth data and calculating first information scores for each of the first sensor features and the first map features by recursively splitting each of the first sensor features and the first map features. The first information scores may correspond to quality of the first sensor data and the first map data.

Examples of the processor 202 may be an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits. The processor 202 may implement a number of processor technologies known in the art such as a machine learning model, a deep learning model, such as a recurrent neural network (RNN), a convolutional neural network (CNN), and a feed-forward neural network, or a Bayesian model. As such, in some embodiments, the processor 202 may include one or more processing cores configured to perform independently. A multi-core processor may enable multiprocessing within a single physical package.

Additionally or alternatively, the processor 202 may include one or more processors configured in tandem via the bus to enable independent execution of instructions, pipelining and/or multithreading. Additionally or alternatively, the processor 202 may include one or processors capable of processing large volumes of workloads and operations to provide support for big data analysis. However, in some cases, the processor 202 may be a processor specific device (for example, a mobile terminal or a fixed computing device) configured to employ an embodiment of the disclosure by further configuration of the processor 202 by instructions for performing the algorithms and/or operations described herein.

In some embodiments, the processor 202 may be configured to provide Internet-of-Things (IoT) related capabilities to users of the UE 104 disclosed herein. The IoT related capabilities may in turn be used to provide smart city solutions by providing real time parking updates, big data analysis, and sensor based data collection for providing navigation and parking recommendation services. The environment may be accessed using the I/O interface 208 of the system 102 disclosed herein.

The memory 204 may comprise suitable logic, circuitry, and interfaces that may be configured to store a machine code and/or instructions executable by the processor 202. The memory 204 may be configured to store information including processor instructions for generating the machine learning model. The memory 204 may be used by the processor 202 to store temporary values during execution of processor instructions. The memory 204 may be configured to store different types of data, such as, but not limited to, the first sensor data and the first map data from the database 108B. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may comprise suitable logic, circuitry, and interfaces that may be configured to communicate with the components of the system 102 and other systems and devices in the network environment 100, via the network 114. The network interface 206 may communicate with the services platform 106 and the plurality of content provider 112A . . . 112N, via the network 114 under the control of the processor 202. In one embodiment, the network interface 206 may be configured to communicate with the sensor unit 104C disclosed in the detailed description of FIG. 1 and may receive input specifying a certain geographic region, such as a first geographic region. In an alternative embodiment, the network interface 206 may be configured to receive the first sensor data from the OEM cloud 106 over the network 114 as described in FIG. 1. In some example embodiments, the network interface 206 may be configured to receive destination information of a vehicle, such as the vehicle 116, via the network 114. In accordance with an embodiment, a controller of the UE 104 may receive the first sensor data and the second sensor data from a positioning system of the UE 104. The network interface 206 may be implemented by use of known technologies to support wired or wireless communication of the system 102 with the network 114. Components of the network interface 206 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer circuit.

The I/O interface 208 may comprise suitable logic, circuitry, and interfaces that may be configured to operate as an I/O channel/interface between the UE 104 and different operational components of the system 102 or other devices in the network environment 100. The I/O interface 208 may facilitate an I/O device (for example, an I/O console) to receive an input (e.g., from the UE 104 for a degree of reliability of the first sensor data and the first map data at a first instance of time) and present an output to the UE 104 based on the received input. The I/O interface 208 may obtain the first sensor data from the OEM cloud 106 and the first map data from the database 108B to store in the memory 202. The I/O interface 208 may include various input and output ports to connect various I/O devices that may communicate with different operational components of the system 102. In accordance with an embodiment, the I/O interface 208 may be configured to output the reliability data to a user device, such as, the UE 104 of FIG. 1.

In example embodiments, the I/O interface 208 may be configured to provide the reliability data to the database 108A to update the map of a certain geographic region, such as the first geographic region. In accordance with an embodiment, a user requesting a route through such a road in the first geographic region may be updated about the quality of first sensor data and the first map data, for example, to slow down the speed of the vehicle 116 because of presence of the physical divider 120 based on the high reliability of first sensor data as compared to the first map data. In an embodiment, the system 102 may be configured to assist in providing navigational suggestions to the vehicle 116. Examples of the input devices may include, but is not limited to, a touch screen, a keyboard, a mouse, a joystick, a microphone, and an image-capture device. Examples of the output devices may include, but is not limited to, a display, a speaker, a haptic output device, or other sensory output devices.

In accordance with an embodiment, the processor 202 may train the machine learning model 210 to evaluate the quality of the sensor data and the map data. The machine learning model 210 may be configured to assign first information scores for each of the first sensor features and the first map features by recursively splitting each of the first sensor features and the first map features. The first information scores may correspond to quality of the first sensor data and the first map data. The first information scores may correspond to a rank of each of the first sensor features and the first map features. An order of the rank may start with a top ranked feature that corresponds to a most informative feature. In accordance with an embodiment, the machine learning model 210 may be configured to assign weights to each of the features (such as, but not limited to, first sensor features and the first map features) associated with data (such as, but not limited to, the first sensor data and the first map data). In accordance with an embodiment, various data sources may provide data (such as, but not limited to, the first sensor data and the first map data) as an input to the machine learning model 210. In accordance with an embodiment, features (such as the first sensor features and the first map features) may be provided as an input to the machine learning model 210. The machine learning model 210 may configure the ground truth data associated with the road object (such as, the physical divider 120). In accordance with an embodiment, the ground truth data may correspond to presence or absence of the road object (such as, the physical divider 120) on a road. Examples of the machine learning model 210 may include, but not limited to, Decision Tree (DT), Random Forest, and Ada Boost. In accordance with an embodiment, the memory 204 may include processing instructions for training of the machine learning model 210 with data set that may be real-time (or near real time) data or historical data. In accordance with an embodiment, the data may be obtained from one or more service providers.

FIG. 3 illustrates an exemplary scenario 300 depicting a problem of mismatch while superimposition of the sensor data on a map obtained from the database 108B in a geographic location, in accordance with an embodiment.

There are shown roads 302, 304, 306 and 308. The sensor data obtained from the consumer vehicles may be shown by dots 310. Further, one or vehicles may be shown traversing on the roads 302, 304, 306 and 308. For the sake of brevity, only one vehicle, that is, a vehicle 312 (e.g. like vehicle 116) is labelled in FIG. 3.

Collecting data from sensors of consumer vehicles may be an evolving technology. Due to this, the quality of the data (such as the first sensor data) coming from the consumer vehicles may not be good enough to develop predictive models which may be further used for navigation and mapping applications. The dots 310 shown in the FIG. 3 may be generated by the sensors of the consumer vehicles. The dots 310 may be generated when the consumer vehicles may be travelling on the roads, such as the roads 302, 304, 306 and 308. The dots 310 may correspond to the sensor data generated by the consumer vehicles. With reference to FIG. 3, most of the dots 310 may be scattered outside of the roads 302, 304, 306 and 308 because of noise and randomness of the sensor data. Consequently, the features generated out of the observations (such as, physical divider observations) may be inaccurate, in accordance with an embodiment. When the inaccurate features may be used as an input for a predictive model that may result in making the predictive model ineffective for mapping and navigation applications. When such erroneous features may be learnt and used to build/update a map database (such as the database 108B of the mapping platform 108), the database 108B cannot be regarded as a reliable database and users of such a database may be provided with improper navigation assistance. Alternately, when erroneous observations may be utilized locally by a vehicle for performing navigation functions, the vehicle may not be able to correctly comprehend the physical divider observations which can lead to undesired situations, such as, accidents.

The system 102 may be configured to measure the quality of the data (such as, the first sensor data and the first map data) so that high quality data may be used and low quality data may be discarded. The present disclosure may describe a machine learning based framework where a machine learning model may be generated that assesses and measures the quality of the first sensor data and the first map data as the high quality data and the low quality data. Further, only high quality data may be used and low quality data may be discarded by predictive models, such that the high quality data may be used for navigation and mapping applications.

In some example embodiments, the system 102 may provide measures for rectifying the aforesaid problem. For example, when a road object (such as the physical divider 120) is reported at the mapping platform 108 for learning purposes (from the first sensor data) while being captured by consumer vehicles, the mapping platform 108 may trigger and invoke the system 102 to evaluate the quality of the first sensor data and the first map data corresponding to the road object (such as the physical divider 120) to find that the road object observation is likely prone to a potential problem of mismatch while superimposition of the first sensor data on the map obtained from the first map data. In the exemplary scenario depicted in FIG. 3, the problem does exist as represented by dots 310 scattered outside the road. Alternately, the system 102 may be invoked on demand or routinely to evaluate the quality of the first map data and the first sensor data prone to the problem of mismatch while superimposition of the sensor data on the map obtained from the map data.

In accordance with an embodiment, on being triggered, the system 102 may obtain the sensor features (such as, first sensor features) and the map features (such as, first map features) of the reported road objects on the roads 302 to 308 from the database 108B. The system 102 may determine reliability first data from the first sensor data and the first map data, a detailed description of which is provided in FIG. 5.

FIG. 4A illustrates a tabular representation 400A of the first sensor data obtained by the system 102 exemplarily illustrated in FIG. 1, in accordance with an embodiment. FIG. 4A is explained in conjunction with FIG. 1 to FIG. 3. There is shown a sensor message corresponding to the first sensor data which may be captured by sensors of a vehicle on a road. The sensor message may be used for determination of the first sensor features as shown in FIG. 4B.

FIG. 4B illustrates a tabular representation 400B of the first sensor features obtained from the first sensor data exemplarily illustrated in FIG. 4A, in accordance with an embodiment. FIG. 4B is explained in conjunction with FIG. 1 to FIG. 4A.

The first sensor features may be obtained from the first sensor data captured by a plurality of sensors in the first geographic region for a predefined date. The first sensor features correspond to one or more attributes of the road object. The one or more first attributes may comprise one or more of distance in meters (DIM), median, maximum, minimum, standard deviation, event type, consistency and road object flag. The road object may comprise a road sign, a physical divider or a hazard on a road.

The DIM may be described as an average of all road object distances. In accordance with an embodiment, the DIM may be measured in meters. In accordance with an embodiment, the DIM may be rounded to 2 decimal places. The median may correspond to all road object distances. In accordance with an embodiment, the median may be measured in meters. The maximum may correspond to largest road object distance. In accordance with an embodiment, the maximum may be measured in meters. The minimum may correspond to lowest road object distance. In accordance with an embodiment, the minimum may be measured in meters. In accordance with an embodiment, the standard deviation may be measured in meters. Further, in accordance with an embodiment, the standard deviation may be rounded to 2 decimal places. For the event type of a probe, function script may transmit probes "INITIAL (1)", "UPDATE (2)" and "CANCELLATION (3)". In accordance with an embodiment, measure of the consistency between the road object and radar points distance measurements of all packages in a current window. The consistency may be given as a value between 0 and 1. The value of the consistency may tend to be 1 when difference between the distance and each quantile (25, 50, 75) is very small, otherwise the value of the consistency may tend more towards 0. The road object flag may describe whether sensor has detected the road object or not. The output of the road object flag may be a Boolean value (true or false).

FIG. 4C illustrates a tabular representation 400C of the first map features obtained from the first map data by the system 102 exemplarily illustrated in FIG. 1, in accordance with an embodiment. FIG. 4C is explained in conjunction with FIG. 1 to FIG. 4B.

The first map features may be obtained from the first map data of the database 108B for a predefined date. The first map features may correspond to one or more attributes of the road object, such as, one or more of display bits, functional class, speed category, from reference number of lane, to reference number of lane, from reference physical number lane, to reference physical number lane, number of lanes, from speed limit, from speed limit, access bits, long haul, lane category, physical divider, intersection category, stub link, or special attributes.

To/from reference number of lane may refer to the number of lanes on a road. To/from physical number of lanes may be similar to "reference number of lanes" in most cases. However, there may be a case where extra lanes may have been created with temporary divider or barricades, for example at construction work. To/from speed limit may refer to the speed limit in to direction of the road.

Functional class may be defined as a road type indicator, reflecting traffic speed and volume, as well as the importance and connectivity of the road. The functional class may vary from country to country depending on the local traffic law. The functional class may be defined by following types: Type 1: a road with high volume, maximum speed traffic; Type 2: a road with high volume, high speed traffic; Type 3: a road with high volume traffic; Type 4: a road with high volume traffic at moderate speeds between neighborhoods; and Type 5: a road whose volume and traffic flow are below the level of any other functional class. Further, in general three basic types of roads and streets may be identified in the functional classification process: arterials, collectors, and locals. Arterials are expected to provide direct routings for large volumes of traffic traveling long distances at high operating speeds. Collector roads may serve a dual function as they provide some degree of mobility and they also serve abutting property while servicing shorter trips and acting as feeders to the arterials. The roads in local system provide direct access to abutting property for relatively short trips and low volumes at the expense of free-flowing movement. Functional classification is a permanent but evolving representation of a road network. Intersection category may be divided into free flow (No intersection or intersection where the crossroad stops), signal (Intersection controlled by a traffic signal), all stop (the intersection is an all-way stop) and stop sign (the approach has to stop for the crossroad).

The special attributes may include, but not limited to, geometry information of a lane. Display bits may convey the information that whether the road may be paved, private, four wheel drive, ramp, tollway, place of interest access, controlled access, motorway, boat ferry, rail, ferry, multi digitized, parking lot road, express lane, reversible, frontage, carpool, public access and delivery road. Speed category may include 8 different speed categories which are 1 (>130 KPH/>80 MPH), 2 (101-130 KPH/65-80 MPH), 3 (91-100 KPH/55-64 MPH), 4 (71-90 KPH/41-54 MPH), 5 (51-70 KPH/31-40 MPH), 6 (31-50 KPH/21-30 MPH), 7 (11-30 KPH/6-20 MPH), and 8 (<11 KPH/<6 MPH). The KPH may stand for kilometers per hour and MPH may stand for miles per hour.

FIG. 4D illustrates a representation 400D of ground truth (GT) data for a road object in a geographic region, obtained from dedicated vehicles, in accordance with an embodiment. FIG. 4D is explained in conjunction with FIG. 1 to FIG. 4C.

A typical GT for the road object (such as, a physical divider (PD)) is shown in FIG. 4D. The ground truth data may be obtained from a plurality of sensors of one or more dedicated and advance sensing vehicles (such as a True Vehicle from HERE Technologies) in the geographic region (say, the first geographic region) for a predefined date. In accordance with an embodiment, the ground truth data may correspond to detection of presence or absence of the physical divider 120 in the first geographic region. The white dots 402 may represent PD OFF and black dots 404 may represent actual PD ON. In some implementation the ground truth data that is collected by the advance sensing vehicle is manually/human verified to ensure high quality of the reference data.

In accordance with an embodiment, the machine learning model 210 may be developed to access and measure the quality of the input (the first map data and the first sensor data) that may be further used to predict the presence of the road objects, such as, but not limited to, the physical dividers 120. Therefore, GT data of the physical dividers may be collected by the dedicated vehicles. The dedicated vehicles may detect whether the physical divider is present or absent, as "PD ON" or "PD OFF" respectively. The system 102 may generate the machine learning model by configuring the GT data.

FIG. 5 is a schematic diagram 500 that illustrates an exemplary scenario for evaluating quality of data using the system 102, in accordance with an embodiment. FIG. 5 is explained in conjunction with FIG. 1 to FIG. 4D.

There is shown images 502 and 504, a vehicle 506, and a physical divider 508. The image 502 shows the vehicle 506 travelling on a road in a first geographic region. The image 504 shows the vehicle 506 travelling on a road in a second geographic region.

In accordance with an embodiment, the system 102 may be configured to obtain the first sensor features of the first sensor data associated with a road object (such as, the physical divider 508) in a first geographic region. The system 102 may be configured to obtain the first map features of the first map data associated with the physical divider 508 and ground truth data associated with the physical divider 508. The sensor features, the map features and the GT data has been explained in FIG. 4A to 4D.

In accordance with an embodiment, the sensor features may be obtained from the OEM sensors. In accordance with an embodiment, there may be two sets of sensor data obtained from two different OEM sensors. Alternatively, the sensor data may be obtained from same OEM sensors at two different instances of time (such as, at the start of a month and at the end of the month). It may be possible that quality of the sensor data obtained from the same OEM sensors may have changed during the two different instances of time. Therefore, it becomes important to evaluate the quality of data. In accordance with an embodiment, two or more different data types may be evaluated. In accordance with an alternate embodiment, same type of data may be evaluated at different instances of time. In accordance with another embodiment, same type of data obtained from different sources may be evaluated. To evaluate the quality of data (such as, the first sensor data and the first map data), a machine learning model may be developed/generated. The machine learning model 210 may deal with computation and predicting outcomes from the obtained sensor data, the map data and the GT data. The machine learning model 210 may accurately draw conclusions about the quality of data that were not previously known about the data. Normally, the data set may be very large which makes it difficult for a person to handle, and ideal for a machine.

Further, the machine learning model 210 may be generated using the sensor features (such as, the first sensor features), the map features (such as, the first map features) and the GT data. The machine learning model 210 may correspond to a tree-based machine learning model. Examples of the machine learning model may include, but not limited to, decision tree, Random Forest, and Ada Boost. In accordance with an embodiment, a decision tree algorithm may be used for the machine learning model 210.

In a tree-based machine learning model, recursive division of the features (such as, the first sensor features and the first map features) may be carried out using entropy. In other words, to recursively split each of the sensor features and the map features, the processor 202 of the system 102 may be further configured to calculate entropy of each of the first sensor features and the first map features. The entropy may correspond to measure of impurity, disorder or uncertainty. The entropy, as it relates to machine learning model 210, may be a measure of the randomness in the information being processed. The higher the entropy, the harder it is to draw any conclusions from that information. The entropy may control how a decision tree decides to split the first sensor features and the first map features. The entropy may actually effect how a decision tree draws its boundaries. The processor 202 of the system 102 may calculate the entropy to identify which feature from the first sensor features and the first map features may have maximum influence in prediction of quality and thereby an information score (such as, a first information score) may be developed.

The entropy may be calculated as:

$$\text{Entropy}(S) = p_+(-\log_2 p_+) + p_-(-\log_2 p_-)$$

wherein S is a sample of training examples associated with the sensor features and the map features,
wherein p+ is proportion of positive class in S,
wherein p− is proportion of negative class in S,
wherein a log function to the base 2 is used, because the information is encoded in bits, and
wherein entropy (S) is average optimal number of bits to encode information about certainty or uncertainty in S.

The processor 202 of the system 102 may be further configured to calculate an information gain associated with each of the first sensor features and the first map features at each level of the decision tree. The calculation of the information gain may be based on a difference in the calculated entropy at two consecutive levels of the decision tree. The information gain at each level of the decision tree may be inversely proportional to the calculated entropy at each level. The split with lowest calculated entropy may correspond to a maximum information gain.

The information gain may be calculated as:

$$\text{Gain}(S, A) = \text{Entropy}(S) - \sum_{v \in Values(A)} \frac{|S_v|}{|S|} \text{Entropy}(S_v)$$

wherein S is a sample of training examples associated with the sensor features and the map features,
wherein entropy (S) is average optimal number of bits to encode information about certainty or uncertainty in S,
wherein A is an attribute/feature from the first sensor features and the first map features, and wherein $S_v$ is a subset of the attribute/feature from the first sensor features and the first map features.

In accordance with an embodiment, the processor 202 may choose highest information gain to split/construct the decision tree. Therefore, all the first sensor features and the first map features may be checked in order to split the decision tree. The information gain may be the key that is used to construct the decision tree. A hierarchical structure of the decision tree may lead to final outcome by traversing through nodes of the decision tree. Each node of the decision tree may comprise of an attribute or feature which is further split into more nodes as moving down the decision tree.

An attribute or feature (from the sensor features and the map features) with highest information gain may be split first. The information gain measures how much "information" a feature gives about a class. The class may correspond to either a high quality data or a low quality data. In a real world scenario, with more than two features, the first split may be made on the most informative feature and then at every split, the information gain for each additional feature may need to be recomputed because it would not be the same as the information gain from each feature by itself. The entropy and the information gain would have to be calculated after one or more splits may have already been made which would change the results. The decision tree may decide on the best order of features to split on and decides when to stop when it trains itself on given data.

The processor 202 of the system 102 may be further configured to generate the machine learning model by configuring the GT data and calculating first information scores for each of the first sensor features and the first map features by recursively splitting each of the first sensor features and the first map features. The first information scores may correspond to quality of the first sensor data and the first map data. The first information scores may further correspond to a rank of each of the first sensor features and the first map features. An order of the rank may start with a top ranked feature that corresponds to a most informative feature.

The processor 202 of the system 102 may be further configured to calculate a first feature importance score for each of the first sensor features and the first map features, based on the information gain associated with each of the first sensor features and the first map features of one or more decision trees. In accordance with an embodiment, the machine learning model (such as, a random forest machine learning model) may use multiple random decision trees for a better accuracy and to reduce variance of individual decision trees by randomly selecting decision trees and then either averaging them or picking the class that gets the most votes.

The processor 202 of the system 102 may be further configured to determine reliability first data from the first sensor data and first map data. In other words, the system 102 may rely on the data, from the first sensor data and first map data, which is better in quality for using the reliability first data for applications, such as, but not limited to, mapping applications and navigation applications.

The processor 202 of the system 102 may be further configured to receive an input specifying the first geographic region. The input may be received from a user driving the vehicle 506 or the vehicle 506 itself. In accordance with an embodiment, the input may correspond to a request for a route in the first geographic region. Further, the system 102 may perform a search for vehicle sensor data within the first geographic region as shown in image 502. In accordance with an embodiment, the system 102 may query the map database (such as, the database 108B) to obtain first sensor data reported by vehicles that traversed the road link in the first geographic region. Therefore, first sensor data for the first geographic region may be obtained. Further, the system 102 may obtain the first map data to the road link in the first geographic region.

The processor 202 of the system 102 may be further configured to generate a notification message indicating a degree of reliability of the first sensor data and the first map data at a first instance of time, based on the reliability first data from the first sensor data and first map data. The first instance of time may correspond to near real time. In an exemplary embodiment, the first map data may be better in quality as compared to the first sensor data. As shown in the image 502, weather is cloudy, dark and rainy because of which the obtained first sensor data associated with the physical divider 120, may be of poorer quality as compared to the first map data. In accordance with an embodiment, the system 102 or the vehicle 506 may dynamically wait for autonomous functions or notifications to rely upon. In accordance with an embodiment, the notification message may indicate that the first map data may be relied on as compared to the first sensor data at the first instance of time in the first geographic region for the route request.

The processor 202 of the system 102 may be further configured to receive an input specifying a second geographic region (as shown in image 504) at a second instance of time. The input may be received from the user driving the vehicle 506 or the vehicle 506 itself. In accordance with an embodiment, the input may correspond to a request for a route in the second geographic region. The second instance of time may correspond to a near real time. For example, the second instance of time may be 2 hours later to the first instance of time.

The processor 202 of the system 102 may be configured to access the machine learning model 210 which is trained on the first sensor features of the first sensor data, the first map features of first map data, and the ground truth data associated with the road object (the physical divider 508). The processor 202 of the system 102 may be further configured to obtain second sensor features of second sensor data in the second geographic region for another road object (a physical divider 510) and second map features of second map data in the second geographic region. The processor 202 of the system 102 may be further configured to calculate second information scores, using the machine learning model 210, for each of the obtained second sensor features and the second map features by recursively splitting each of the second sensor features and the second map features. The processor 202 of the system 102 may be configured to determine reliability second data from the second sensor data and the second map data, based on the second information scores being greater than the pre-defined threshold value. In an exemplary embodiment, the weather is sunny in the second geographic region (as shown in image 504) because of which the second sensor data may have better quality as compared to the second map data. Therefore, the second sensor data may be considered as the reliability second data from the second sensor data and the second map data in the second geographic region at the second instance of time.

The processor 202 of the system 102 may be configured to compare the second reliability data with the first reliability data, based on the second information scores and the first information scores. The processor 202 of the system 102 may be configured to generate a notification message for the vehicle 506 indicating a degree of reliability of data from the first reliability data or the second reliability data at the second instance of time, based on the comparison. Based on the notification message, the vehicle 506 may decide to change into autonomous mode or manual mode. For example, the notification message may inform the vehicle 506 or the UE 104 about availability of accurate and up-to-date data for the second geographic region. Alternatively, the available up-to-date data may be pushed as an update to the vehicle 506 or the UE 104. In this way, a beneficiary of the data (such as, the vehicle 506) may be provided with highly accurate navigation assistance based on the up-to-date data by the system 102.

FIGS. 6A and 6B illustrate a graphical representation 600A and a tabular representation 600B respectively to show feature importance associated with the first sensor features and the first map features, in accordance with an embodiment. FIGS. 6A and 6B are explained in conjunction with FIG. 1 to FIG. 5.

The feature from the first sensor features and the first map features with maximum information gain may be the most influential feature, whereas, the feature with minimum information gain may be the least influential feature. In accordance with an embodiment, a random forest machine learning model (such as the machine learning model 210) may be trained using the first sensor features, the first map features and the GT data and then finally feature importance calculation may be carried out.

With reference to FIG. 6A, x-axis shows the first map features and the first sensor features (mapped in the tabular representation shown in FIG. 6B) and the y-axis shows the feature importance derived from the information gain.

The feature importance may be based on the calculated first information scores for each of the first sensor features and the first map features. The feature importance may be calculated in such a way that sum of all the feature importance is equal to 1.

$$\sum_{i=1}^{n} x_i = 1$$

wherein n represents number of the first sensor features and the first map features, and
wherein $x_i$ represents the feature importance score (also referred as the first information score) for the $i^{th}$ feature.

In accordance with an embodiment, when the feature from the first sensor features and the first map features may be important for the prediction, then the value for $x_i$ may be high on the y-axis as shown in FIG. 6A.

FIG. 6B illustrates a tabular representation that shows the importance of features from the first sensor features and the first map features in the descending order. There is shown feature number, feature name, feature type and score based on information gain.

As shown in the tabular representation, in accordance with an embodiment, the map features (also referred as the first map features) may be highly influential in prediction as compared to the sensor features (also referred as the first sensor features). All the first map features may have high scores and the first sensor features may have low score. This shows that the first sensor data quality is not as good as the first map data quality, in accordance with an embodiment.

Further, in accordance with an embodiment, improvement in the quality of sensor data may be tested. When new set of sensor data (such as, the second sensor data) may be received, the same machine learning model 210 may be used that may be further trained with new sensor data and feature importance may be calculated (as shown above). When the sensor feature moves to the left then it signifies that the quality of the sensor data has improved relative to the map feature. A threshold or a benchmark 'feature importance score' can be set to measure the quality of the sensor data. For example, if any feature which scores above 0.05 is considered good and can be used for generating a machine learning model.

FIG. 7 illustrates a flowchart 700 for implementation of an exemplary method for generating a machine learning model based on first sensor data and first map data, in accordance with an example embodiment. FIG. 7 is explained in conjunction with FIG. 1 to FIG. 6B. The control starts at 702.

At 702, first sensor features of the first sensor data associated with a road object in a first geographic region, first map features of the first map data associated with the road object and ground truth data associated with the road object may be obtained. The processor 202 may be configured to obtain first sensor features of the first sensor data associated with a road object in a first geographic region, first map features of the first map data associated with the road object and ground truth data associated with the road object.

The first sensor features may be obtained from the first sensor data captured by a plurality of sensors in the first geographic region for a predefined date. The first sensor features may correspond to one or more attributes of the road object. The one or more first attributes may comprise one or more of distance of the road object, median, maximum, minimum, standard deviation, event type, consistency and road object flag. The road object may comprise a road sign, a physical divider or a hazard on a road.

The first map features may be obtained from the first map data of a map database for a predefined date. The first map features may correspond to one or more attributes of the road object. The one or more attributes may comprise one or more of display bits, functional class, speed category, number of lanes, speed limit, access bits, long haul, lane category, physical divider, intersection category, lane category, stub link, or special attributes.

The ground truth data may be obtained from a plurality of sensors of one or more dedicated vehicles in the geographic region for a predefined date. The ground truth data may correspond to detection of presence or absence of the road object in the first geographic region.

At 704, entropy of each of the first sensor features and the first map features may be calculated. The processor 202 may be configured to calculate entropy of each of the first sensor features and the first map features. The entropy may be calculated as:

$$\text{Entropy}(S) = p_+(-\log_2 p_+) + p_-(-\log_2 p_-)$$

wherein S is a sample of training examples associated with the sensor features and the map features, wherein p+ is proportion of positive class in S, wherein p− is proportion of negative class in S, and wherein entropy (S) is average optimal number of bits to encode information about certainty or uncertainty in S.

At 706, an information gain associated with each of the first sensor features and the first map features at each level of a decision tree may be calculated. The processor 202 may be configured to calculate an information gain associated with each of the first sensor features and the first map features at each level of a decision tree, based on a difference in the calculated entropy at two consecutive levels of the decision tree. The information gain at each level of the decision tree may be inversely proportional to the calculated entropy at each level. The split with lowest calculated entropy may correspond to a maximum information gain.

At 708, machine learning model 210 may be generated. The processor 202 may be configured to generate the machine learning model 210 by configuring the ground truth data and calculating first information scores for each of the first sensor features and the first map features by recursively splitting each of the first sensor features and the first map features. The first information scores may correspond to quality of the first sensor data and the first map data.

The first information scores may correspond to a rank of each of the first sensor features and the first map features. An order of the rank may start with a top ranked feature that corresponds to a most informative feature.

At 710, reliability first data from the first sensor data and first map data may be determined. The processor 202 may be configured to determine reliability first data from the first sensor data and first map data, based on the first information scores being greater than a pre-defined threshold value.

At 712, an input specifying the first geographic region may be received. The processor 202 may be configured to receive an input specifying the first geographic region.

At 714, a notification message indicating a degree of reliability of the first sensor data and the first map data at a first instance of time may be generated. The processor 202 may be configured to generate a notification message indicating a degree of reliability of the first sensor data and the first map data at a first instance of time.

At 716, the machine learning model may be accessed. The processor 202 may be configured to access the machine learning model which is trained on the first sensor features of the first sensor data, the first map features of first map data, and the ground truth data associated with the road object.

At 718, second sensor features of second sensor data in a second geographic region for another road object and second map features of second map data in the second geographic region may be obtained. The processor 202 may be configured to obtain second sensor features of second sensor data in a second geographic region for another road object and second map features of second map data in the second geographic region;

At 720, second information scores may be calculated. The processor 202 may be configured to calculate second information scores, using the machine learning model, for each of the obtained second sensor features and the second map features by recursively splitting each of the second sensor features and the second map features.

At 722, reliability of second data from the second sensor data and the second map data may be determined. The processor 202 may be configured to determine reliability second data from the second sensor data and the second map data, based on the second information scores being greater than the pre-defined threshold value.

At 724, the second reliability data may be compared with the first reliability data. The processor 202 may be configured to compare the second reliability data with the first reliability data, based on the second information scores and the first information scores.

At 726, an input specifying the second geographic region at the second instance of time may be received. The processor 202 may be configured to receive an input specifying the second geographic region at the second instance of time.

At 728, a notification message indicating a degree of reliability of data from the first reliability data or the second reliability data at the second instance of time may be generated. The processor 202 may be configured to generate a notification message indicating a degree of reliability of data from the first reliability data or the second reliability data at the second instance of time, based on the comparison. The control passes to the end.

Accordingly, blocks of the flowchart 700 support combinations of means for performing the specified functions and combinations of operations for performing the specified functions for performing the specified functions. It will also be understood that one or more blocks of the flowchart 700, and combinations of blocks in the flowchart 700, can be implemented by special purpose hardware-based computer systems which perform the specified functions, or combinations of special purpose hardware and computer instructions.

FIG. 8 illustrates a flowchart 800 for implementation of an exemplary method to evaluating quality of sensor data, in accordance with an embodiment. FIG. 8 is explained in conjunction with FIG. 1 to FIG. 7. The control starts at 802.

At 802, a machine learning model which may be trained on first sensor features of first sensor data associated with a road object in a geographic region, and ground truth data associated with the road object may be obtained. The processor 202 may be configured to obtain a machine learning model trained on first sensor features of first sensor data associated with a road object in a geographic region, and ground truth data associated with the road object may be obtained.

At 804, second sensor features of second sensor data associated with the road object may be obtained. The processor 202 may be configured to obtain second sensor features of second sensor data associated with the road object.

In accordance with an embodiment, the second sensor features may be obtained from the second sensor data captured by a plurality of sensors for a predefined date. The second sensor features may correspond to one or more attributes of the road object, The one or more attributes may comprise one or more of distance of the road object, median, maximum, minimum, standard deviation, event type, consistency and road object flag. The road object may comprise a road sign, a physical divider or a hazard on a road.

At 806, the machine learning model may be used by calculating information scores for each of the second sensor features by recursively splitting each of the second sensor features. The processor 202 may be configured to use the machine learning model by calculating information scores for each of the second sensor features by recursively splitting each of the second sensor features.

The information scores may correspond to a rank of each of the second sensor features. An order of the rank may start with a top ranked feature that corresponds to a most informative feature.

At 808, quality of the second sensor data may be evaluated. The processor 202 may be configured to evaluate quality of the second sensor data based on the information scores. The control passes to the end.

Accordingly, blocks of the flowchart 800 support combinations of means for performing the specified functions and combinations of operations for performing the specified functions for performing the specified functions. It will also be understood that one or more blocks of the flowchart 800, and combinations of blocks in the flowchart 800, can be implemented by special purpose hardware-based computer systems which perform the specified functions, or combinations of special purpose hardware and computer instructions.

Alternatively, the system may comprise means for performing each of the operations described above. In this regard, according to an example embodiment, examples of means for performing operations may comprise, for example, the processor 202 and/or a device or circuit for executing instructions or executing an algorithm for processing information as described above.

FIG. 9 illustrates a flowchart 900 for implementation of an exemplary method instructing the vehicle functionality as a function of the information scores, in accordance with an embodiment. FIG. 9 is explained in conjunction with FIG. 1 to FIG. 8. The control starts at 902.

At 902, a machine learning model which may be trained on first sensor features of first sensor data, first map features of first map data, and ground truth data associated with a road object may be accessed. The processor 202 may be configured to access the machine learning model which may be trained on first sensor features of first sensor data, first map features of first map data, and ground truth data associated with a road object.

At 904, second sensor features of second sensor data and second map features of second map data associated with another road object may be obtained, at near real time and the machine learning model calculates information scores for each of the obtained second sensor features and the second map features by recursively splitting each of the second sensor features and the second map features. The processor 202 may be configured to obtain, at near real time, second sensor features of second sensor data and second map features of second map data associated with another road object, the machine learning model.

Alternately, the system 102 may be invoked on demand or routinely to calculate information scores for each of the obtained second sensor features and the second map features by recursively splitting each of the second sensor features and the second map features using the machine learning model.

At 906, vehicle functionality may be instructed as a function of the information scores. The processor 202 may be configured to instruct the vehicle functionality as a function of the information scores. The control passes to the end.

On implementing the method 700, 800 and 900 disclosed herein, the end result generated by the system 102 is a tangible determination of quality of data. The evaluation of quality of data (such as, but not limited to, the first sensor data and the first map data) is of utmost importance as only high quality data from the evaluated quality of data may be further used in predictive models for mapping and navigation applications to avoid mishaps from happening on roads, busy streets, highways, freeways, etc.

Although the aforesaid description of FIGS. 1-9 is provided with reference to the first sensor data, the second sensor data, the first map data, the second map data, however, it may be understood that the invention would work in a similar manner for different types and sets of data as well. The system 102 may generate the machine learning model to evaluate different sets of data at various geographic locations. In case the quality of data may change at different regions or different instances of time, the system 102 may generate a notification message and/or transmit the high quality data (such as, the map data) to the mapping platform. Additionally or optionally, the high quality map data may be provided to an end user, as an update which may be downloaded from the mapping platform 108. The update may be provided as a run time update or a pushed update.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for generating a machine learning model based on first sensor data and first map data, the system comprising:
    at least one memory configured to store computer executable instructions; and
    at least one processor configured to execute the computer executable instructions to:
        obtain first sensor features of the first sensor data associated with a road object in a first geographic region, first map features of the first map data associated with the road object and ground truth data associated with the road object;
        generate the machine learning model by configuring the ground truth data and calculating first information scores for each of the first sensor features and the first map features by recursively splitting each of the first sensor features and the first map features, wherein the first information scores correspond to quality of the first sensor data and the first map data; and
        update a vehicle or user equipment, wherein the update includes, at least in part, the first information scores.

2. The system of claim 1, wherein the first information scores correspond to a rank of each of the first sensor features and the first map features, and wherein an order of the rank starts with a top ranked feature that corresponds to a most informative feature.

3. The system of claim 1, wherein the at least one processor is further configured to:
    receive an input specifying the first geographic region; and
    generate a notification message indicating a degree of reliability of the first sensor data and the first map data at a first instance of time.

4. The system of claim 1, wherein to recursively split each of the sensor features and the map features, the at least one processor is further configured to calculate entropy of each of the first sensor features and the first map features.

5. The system of claim 4, wherein the entropy is calculated as:

$$\text{Entropy}(S) = p_+(-\log_2 p_+) + p_-(-\log_2 p_-)$$

wherein S is a sample of training examples associated with the sensor features and the map features,
    wherein p+ is proportion of positive class in S,
    wherein p− is proportion of negative class in S, and
    wherein entropy (S) is average optimal number of bits to encode information about certainty or uncertainty in S.

6. The system of claim 5, wherein the at least one processor is further configured to calculate an information gain associated with each of the first sensor features and the first map features at each level of a decision tree, based on a difference in the calculated entropy at two consecutive levels of the decision tree, wherein the information gain at each level of the decision tree is inversely proportional to the calculated entropy at each level, and wherein the split with lowest calculated entropy corresponds to a maximum information gain.

7. The system of claim 6, wherein the at least one processor is further configured to calculate a first feature importance score for each of the first sensor features and the first map features, based on the information gain associated with each of the first sensor features and the first map features of one or more decision trees.

8. The system of claim 1, wherein the at least one processor is further configured to determine first reliability data from the first sensor data and first map data, based on the first information scores being greater than a pre-defined threshold value.

9. The system of claim 8, wherein the at least one processor is further configured to:
    access the machine learning model which is trained on the first sensor features of the first sensor data, the first map features of first map data, and the ground truth data associated with the road object;
    obtain second sensor features of second sensor data in a second geographic region for another road object and second map features of second map data in the second geographic region;
    calculate second information scores, using the machine learning model, for each of the obtained second sensor features and the second map features by recursively splitting each of the second sensor features and the second map features.

10. The system of claim 9, wherein the at least one processor is further configured to determine second reliability data from the second sensor data and the second map data, based on the second information scores being greater than the pre-defined threshold value.

11. The system of claim 10, wherein the at least one processor is further configured to compare the second reliability data with the first reliability data, based on the second information scores and the first information scores.

12. The system of claim 11, wherein the at least one processor is further configured to:
    receive an input specifying the second geographic region at the second instance of time; and
    generate a notification message indicating a degree of reliability of data from the first reliability data or the second reliability data at the second instance of time, based on the comparison.

13. The system of claim 1, wherein the at least one processor is further configured to transmit the quality of the first sensor data and the first map data to at least one subject, wherein the subject comprises at least one of a vehicle or a user equipment.

14. The system of claim 1,
    wherein the first map features are obtained from the first map data of a map database for a predefined date, and
    wherein the first map features correspond to one or more attributes of the road object, wherein the one or more attributes comprise one or more of display bits, functional class, speed category, number of lanes, speed limit, access bits, long haul, lane category, physical divider, intersection category, lane category, stub link, or special attributes.

15. The system of claim 1,
    wherein the ground truth data is obtained from a plurality of sensors of one or more dedicated vehicles in the geographic region for a predefined date; and
    wherein the ground truth data corresponds to detection of presence or absence of the road object in the first geographic region.

16. The system of claim 1,
    wherein the first sensor features are obtained from the first sensor data captured by a plurality of sensors in the first geographic region for a predefined date,
    wherein the first sensor features correspond to one or more attributes of the road object, wherein the one or more attributes comprise one or more of distance of the road object, median, maximum, minimum, standard deviation, event type, consistency and road object flag, and wherein the road object comprises a road sign, a physical divider or a hazard on a road.

17. The system of claim 1, wherein the machine learning model corresponds to a tree-based machine learning model.

18. A non-transitory computer readable medium having stored thereon, computer-executable instructions for causing a computer to execute operations for selecting vehicle functionality, the operations comprising:

accessing a machine learning model which is trained on first sensor features of first sensor data, first map features of first map data, and ground truth data associated with a road object;

obtaining, at near real time, second sensor features of second sensor data and second map features of second map data associated with another road object, wherein the machine learning model calculates information scores for each of the obtained second sensor features and the second map features by recursively splitting each of the second sensor features and the second map features; and instructing the vehicle functionality as a function of the information scores.

* * * * *